United States Patent
Claflin et al.

[11] 3,729,212
[45] Apr. 24, 1973

[54] DOUBLE FLANGED SUPPORT LEG

[75] Inventors: Hyle K. Claflin, North Muskegon; Jack T. Belke, Grand Rapids, both of Mich.

[73] Assignee: Westarn Corporation, Muskegon, Mich.

[22] Filed: Dec. 21, 1970

[21] Appl. No.: 100,135

[52] U.S. Cl. .......................... 280/150.5, 254/86 R
[51] Int. Cl. .................................. B60s 9/02
[58] Field of Search ................ 280/150.5, 475; 254/86 R

[56] References Cited

UNITED STATES PATENTS

| | | | |
|---|---|---|---|
| 2,896,967 | 7/1959 | Dalton | 280/150.5 |
| 3,077,120 | 2/1963 | Viehweger | 254/86 R |
| 3,081,065 | 3/1963 | Dalton | 254/86 R |

Primary Examiner—Leo Friaglia
Assistant Examiner—Robert R. Song
Attorney—Hauke, Gifford & Patalidis

[57] ABSTRACT

A landing gear support wherein the same leg may be used as either the right or left leg of the support. The leg includes a pair of flanges, one on each side of the upper end of the leg such that the leg may be secured with the flanges to either side of the trailer and may be used on trailers having either outside mounting plates or inside mounting plates. Gear boxes for individually moving the legs between their extended and retracted positions may be mounted to the flanges opposite those being used to mount the leg to the trailer. Alternatively, one gear box may be secured to one of the legs with a shaft extending between the two legs such that the legs may be simultaneously raised or lowered.

13 Claims, 11 Drawing Figures

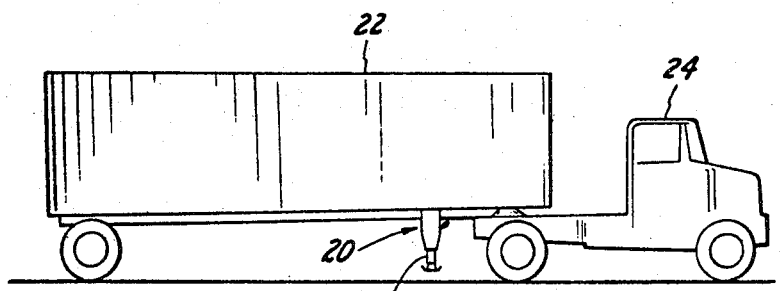
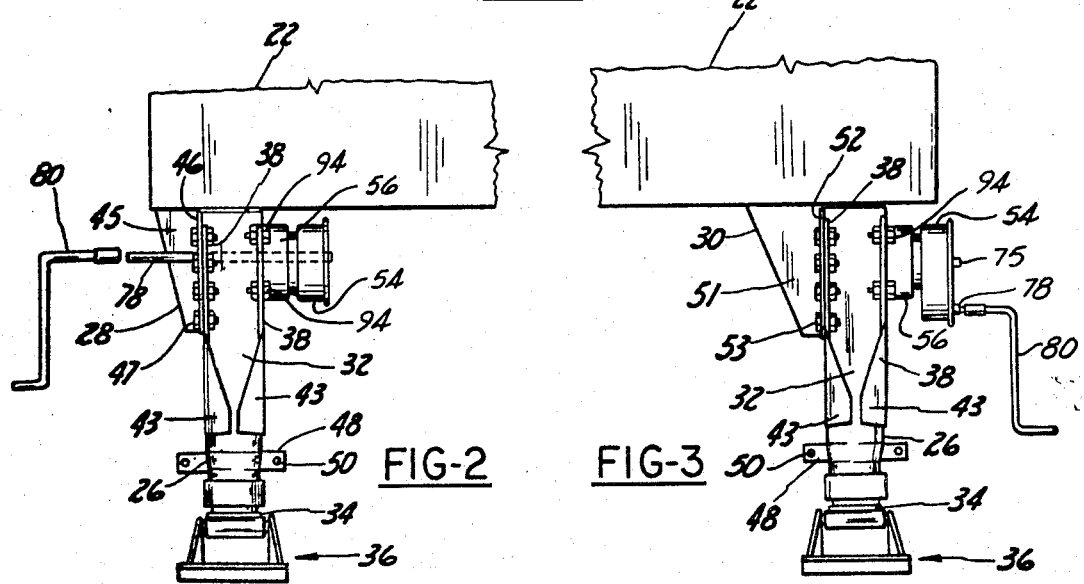
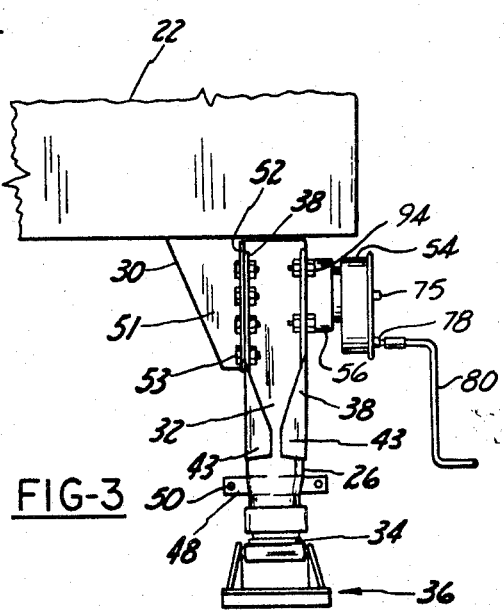
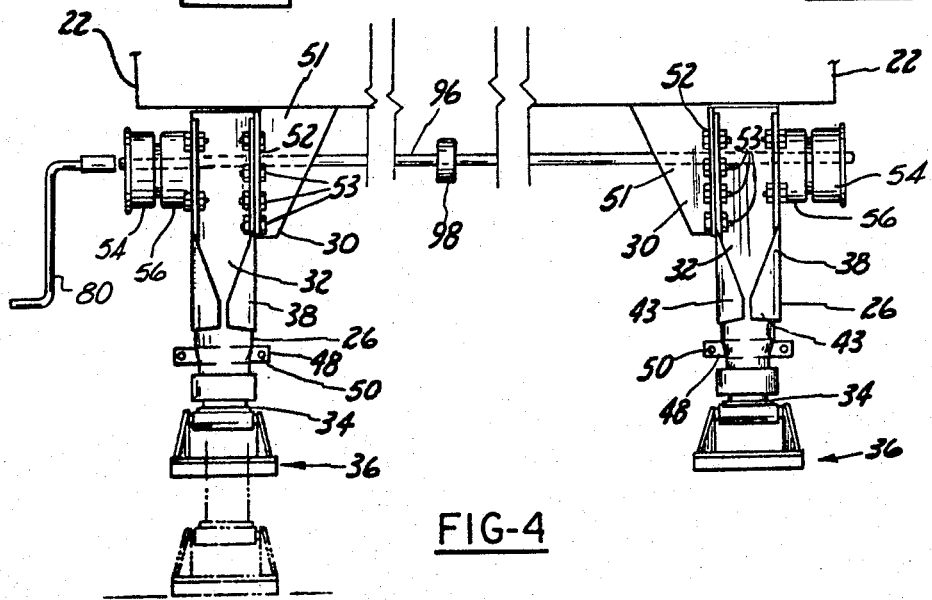

Patented April 24, 1973

DOUBLE FLANGED SUPPORT LEG

BACKGROUND OF THE INVENTION

1. Field of the Invention

The invention relates broadly to landing gears for trailers or similar vehicles and more particularly to a landing gear leg which may be used as either the right or the left leg on trailers having either outside or inside mounting plates.

2. Description of the Prior Art

Heretofore, landing gear assemblies for semi-trailers or the like have used right and left legs having different constructions so that they could not be interchanged. This of course adds to the expense of providing a landing gear assembly. Also, it has heretofore been necessary to provide a different landing gear assembly for trailers depending upon whether the trailer had inside mounting plates or outside mounting plates and such assemblies have been still different depending upon where and how the gear box for raising and lowering the legs was to be mounted. Thus, the lack of standardization between the right and left legs of the landing gear assemblies and the different types of trailer mounting plates and gear box arrangements have unnecessarily increased the cost of landing gear assemblies.

SUMMARY OF THE INVENTION

The landing gear of the present invention solves the problems of the prior art by providing a single leg construction that may be used as either the right or the left leg of the landing gear and on a trailer having either inside or outside mounting plates. The leg includes a pair of generally flat plates secured on opposite sides of the leg and having vertically aligned apertures formed therein along both sides of each of the plates. The plates are used for either mounting the leg to the trailer or the plate can be used to operatively mount a gear box to the leg. Thus, whether a semi-trailer is provided with inside or outside mounting plates, the same leg may be used on either the right or left side of the trailer and the plate or plates which are not being used for mounting the leg to the trailer can be used for the gear box.

When inside mounting plates are provided on the semi-trailer, a gear box may be secured to the outer plate of each of the legs for individually moving the legs between their retracted inoperative position and their extended operative position. Alternatively, one gear box may be mounted on the outer plate of one of the legs with a shaft extending between the legs, such that the legs are simultaneously raised and lowered by a single gear box. When the trailer is provided with outside mounting plates, a gear box may be secured to the inner plate of each of the legs for individually moving the legs between their retracted and extended positions or, alternatively, a gear box may be secured to the inner plate of one of the legs and have a shaft extending between the legs, such that the legs may be simultaneously raised and lowered.

DESCRIPTION OF THE DRAWINGS

The description refers to the accompanying drawings in which like reference characters refer to like parts throughout the several views and in which:

FIG. 1 is a side elevational view of a conventional tractor and trailer utilizing the landing gear of the present invention;

FIG. 2 is a front elevational view of the landing gear leg of the present invention, illustrating the gear box mounted on the inside flange plate of the leg;

FIG. 3 is a front elevational view of the landing gear leg of the present invention, illustrating the gear box mounted on the outside flange plate of the leg;

FIG. 4 is a front elevational view of the landing gear of the present invention wherein gear boxes are mounted on the outside flange plate of each leg and the legs are connected by a clutched shaft;

DESCRIPTION OF THE PREFERRED EMBODIMENT

Figure 5:
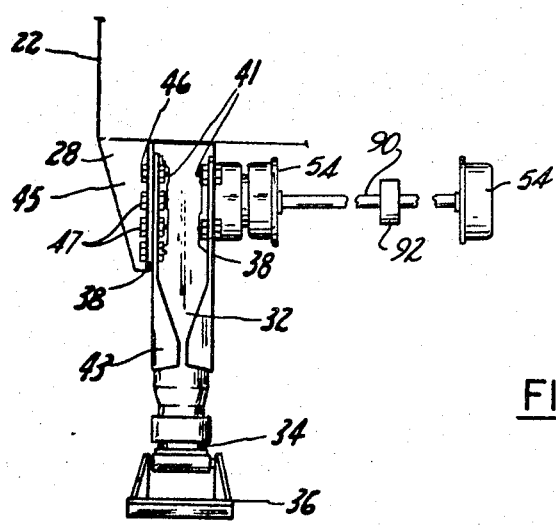
FIG. 5 is a front elevational view of the landing gear leg of the present invention having a gear box mounted on the inside flange plate and a shaft extending to the other landing gear leg.

Referring to FIG. 1, the landing gear of the present invention, generally indicated at 20, is shown connected to the forward portion of a trailer 22 immediately to the rear of the portion of the trailer 22 which is pivotally connected to the rear end of the tractor 24. The landing gear 20 is shown with the landing gear legs 26 in the retracted position, such that the tractor 24 may pull the trailer 22 to its destination. Upon reaching the destination, the landing gear legs 26 are cranked down to their extended position, so that the trailer 22 may be detached from the tractor 24 with the forward portion of the trailer 22 resting upon the landing gear 20.

Referring to FIG. 2, the trailer 22 may be formed with a pair of outside mounting plates 28 (only one of which is shown), which are secured to the forward portion of the trailer 22 adjacent its outer edge on opposite sides thereof for securing the legs 26 thereto. The legs 26 are secured to the inside of the outside mounting plates 28. Alternatively, the trailer 22 may be provided with a pair of inside mounting plates 30, as illustrated in FIGS. 3 and 4, secured to the outer edge of the plates 30.

Each of the legs 26 includes a tubular housing 32 secured to the trailer mounting plates 28 or 30 as hereinafter described. The housing 32 slidably receives an elongated tubular member 34 in its lower end, which may be of any desired cross-sectional shape. The member 34 includes a landing gear foot of any conventional design, generally indicated at 36, secured to its lower end for engaging the ground to support the forward portion of the trailer 22. The landing gear foot 36 may be replaced by any conventional landing gear foot assembly, such as rollers, casters or the like.

The landing gear leg 26 includes a pair of elongated substantially identical flange plates 38 secured on opposite sides thereof and extending downwardly from the upper end of the leg. As can best be seen in FIG. 6, each of the plates 38 has a generally squared upper end 40 and tapers inwardly at its lowered end 42 with upper portions 41 and 43 (FIGS. 2-5) wrapped around the housing 32 for securing the flange plates 38 to the housing 32. Each of the plates 38 includes a set of vertically spaced apertures 44 disposed adjacent opposite vertical edges of the plates in the upper end 40. The plates 38 being on each side of the leg 26 enable the leg 26 to be used interchangeably as either the right or left leg of the landing gear 20 and with a trailer having either outside mounting plates 28 (FIGS. 2 and 5) or inside mounting plates 30 (FIGS. 3-4). Thus, a single leg may be manufactured and used as both the right and left leg of the landing gear 20 and with a trailer having either inside or outside mounting plates, greatly reducing the manufacturing cost of the landing gear 20.

Referring again to FIGS. 2 and 5, if the trailer 22 is provided with outside mounting plates 28, the leg 26 is secured to the inside of the mounting plates 28. The plates 28 include a transversely extending member 45 and a flange 46 extending outwardly from the inner vertical edge of the member 45 for receiving bolts and nuts 47 that extend through the apertures 44 formed in one of the flange plates 38 for securing the leg 26 thereto. The leg 26 is arranged such that outwardly extending tabs 48, each having an aperture 50 formed therein and secured to the lower portion of the housing 32, extend laterally from the leg so that one of the tabs 48 on each leg 26 is positioned to receive one end of an inwardly extending brace (not shown), which aids in securing the leg 26 in its vertical position. As shown in FIG. 2, the leg 26 is secured to the inner edge of the outside mounting plate 28 on the left side of the trailer 22. A similar leg 26 may be used on the right side of the trailer 22. Thus, two legs 26 of the same construction may be used either as the right or left leg of the landing gear 20.

Referring to FIGS. 3 and 4, if the trailer 22 is provided with inside mounting plates 30, the leg 26 is secured to the outside of the mounting plates 30. The plates 30 include a transversely extending member 51 and a flange 52 extending from the outer vertical edge of the member 51 for receiving bolts and nuts 53 that extend through the apertures 44 formed in one of the flange plates 38 for securing the leg 26 thereto. Again, a similar leg 26 is positioned on the opposite side as can best be seen in FIG. 4.

Thus, the same leg 26 may be used either on the right side or the left side of the trailer 22 and with either an inside or an outside mounting plate.

Regardless of which of the flange plates 38 is used for mounting the leg 26 to a trailer 22, the opposite flange plate 38 on that leg 26 is free. The free flange plate 38 can be used then to mount a gear box 54 as will now be explained.

Figure 11:
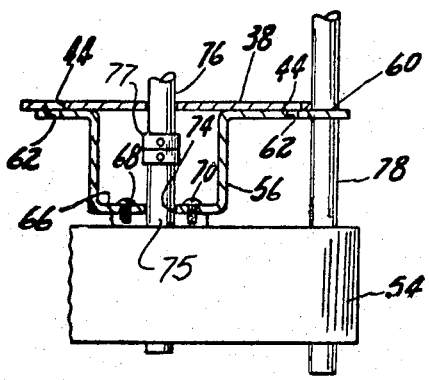
FIG. 11 is a top view of the gear box mounting bracket.

Referring again to FIG. 2, when the leg 26 is secured to a trailer 22 having outside mounting plates 28, the gear box 54, preferably of the two-speed type, may be secured to a U-shaped member 56 which is bolted to the inside flange plate 38 of the leg 26. The U-shaped member 56, as illustrated in FIG. 11, includes a pair of outwardly extending flanges 58 and 60 which have apertures 62 formed therein which align with the apertures 44 formed on the plates 38. Bolts and nuts 94 (FIG. 2) are threaded through the apertures 62 and are tightened thereon to secure the member 56 onto the inside plate 38. The central section 66 of the member 56 includes apertures 68 (FIG. 11) formed therein for receiving bolts 70 for threading into threaded apertures formed in a mounting plate 72, secured to the gear box 54, securing the gear box onto the member 56.

Still referring to FIGS. 2 and 11, the central section 66 includes an aperture 74 formed therein for receiving a shaft 75 which extends therethrough from the gear box 54 and which is connected to a shaft 76 by a coupling 77. The shaft 76 extends into the upper portion of the housing 32. The housing 54 contains a conventional set of gears (not shown) operated by the shaft 76 for raising and lowering the member 34, moving the landing gear leg 26 between its retracted inoperative position shown in FIGS. 2, 3, 5 and 6 and its extended operative position shown in FIG. 4. A second shaft 78 (FIG. 2) spaced from and parallel to shaft 76, extends from the gear box 54 past the member 56 and the plates 38 to the outer edge of the trailer 22, to be engaged by a manual crank 80 to operate the gear box 54, and, thus raise and lower the leg 26 between its extended and retracted positions. As can best be seen in FIG. 6, the flanges 38 are provided with a central aperture 82 for the shaft 76 and cut-outs 84 on opposite sides of the aperture 82 for permitting passage of the shaft 78. Not all of the apertures 82 or cut-outs 84 will be used in any one assembly, but like the provision of the apertures 44 for bolts in the mounting plate, again not all of which will be used, this provides for a number of different possible arrangements.

Figure 7:
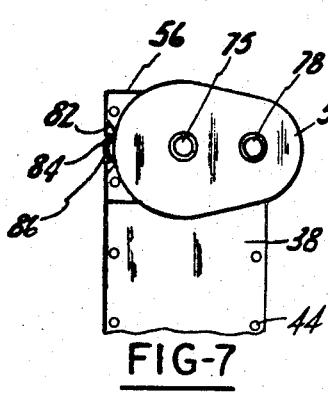
FIGS. 7 through 10 illustrate the four possible orientations of the gear box.
Figures 9, 10:
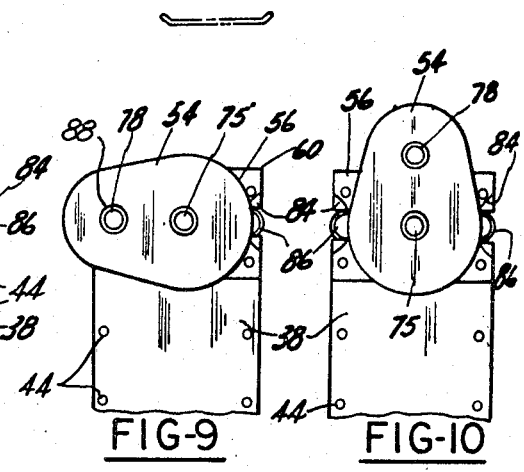

Thus, referring to FIGS. 7 and 9, when the gear box 54 is mounted on the inside of the leg 26, the shaft 78 must be spaced horizontally from the shaft 76 such that the shaft 78 passes along the side of the leg 26 to the outer edge of the trailer 22 to be engaged by the crank 80. The circular cut-outs 82 and 84 allow the shaft 78 to pass therethrough in either orientation of the gear box 54. As can best be seen in FIG. 2 and 9, each of the flanges 46 on the outside mounting plates 28 are also formed with cut-outs 86, which align with the cut-outs 82 and 84 on the opposite flanges for allowing the shafts 76 and 78 to pass therethrough. A sleeve 88 is secured, as by welding or bonding and surrounds the cut-outs 82 and 84 for rotatably receiving the shaft 78 and to give support thereto.

When outside mounting plates 28 are used, the gear box 54 may be secured to the inside flange plates 38 of each of the legs 26 to individually operate each of the legs 26. With gear boxes 54 for each of the legs 26, the legs 26 may be individually raised and lowered and also used to level the forward portion of the trailer 22 when it is parked on uneven ground. This arrangement for one of the legs 26 is illustrated in FIG. 2, but it is to be understood that the opposite leg would be arranged in substantially the same manner.

Figure 6:
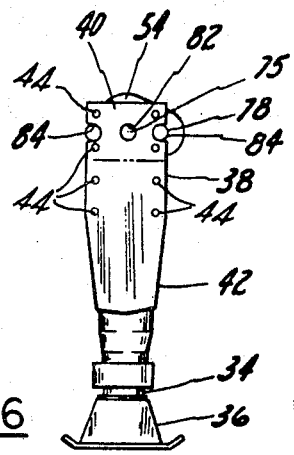
FIG. 6 is a side elevational view of the landing gear leg of the present invention.

Referring to FIG. 5, a shaft 90 may be added that extends between the two gear boxes 54 such that both gear boxes 54 are actuated with a single crank 80 to simultaneously raise and lower both of the legs 26. A manually operated clutch 92 may be connected to the shaft 90 such that the two gear boxes 54 may be disconnected and the legs operated individually. Alternatively, a single gear box 54 may be secured to the inside plate 38 of one of the legs 26 and the shaft 90 used to connect the box 54 to the opposite leg, such that the legs 26 are simultaneously raised and lowered with a single crank and through a single gear box.

Referring to FIG. 3, when the leg 26 is secured to a trailer 22 having inside mounting plates 30, a gear box 54, preferably of the two-speed type, is secured to the U-shaped member 56 which is bolted to the outside flange plate 38 of the leg 26 by bolts and nuts 94. The U-shaped member 56 is preferably constructed as previously described, such that it may be used interchangeably with trailers having inside and outside mounting plates. The shaft 75 of the gear box 54 extends through the aperture 74 of the member 56 and is coupled with the shaft 76 which extends into the upper portion of the housing 32 for raising and lowering the member 34, moving the landing gear leg 26 between its retracted inoperative position and its extended operative position. The shaft 78 extends outwardly from the gear box 54 to be engaged by the manual crank 80 to operate the gear box 54, and thus raise and lower the leg 26.

Figure 8:
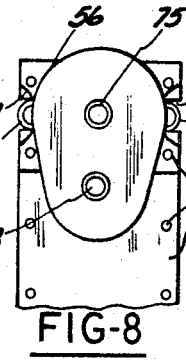

Referring to FIGS. 7 through 10, when the gear box 54 is mounted on the outside of the leg 26, the shaft 78 may be spaced horizontally in either direction from the shaft 75, as shown in FIGS. 7 and 9, or vertically above or below the shaft 75, as shown in FIGS. 8 and 10. The arrangement of the apertures on the flange plates 38 and on the U-shaped members 56 are such as to enable the gear box 54 to be mounted to either of the flange plates 38 in either of the positions shown in FIGS. 7–10.

When inside mounting plates 30 are used, as shown in FIG. 3, a gear box 54 may be secured to the outside flange plates 38 of each of the legs 26 to individually operate each of the legs 26. With gear boxes 54 for each of the legs 26, the legs 26 may be individually raised and lowered. Referring to FIG. 4, a shaft 96 may be added that extends between the upper ends of the two legs 26 as an extension of the shaft 75 such that both gear boxes 54 are actuated with a single crank 80 to simultaneously raise and lower both of the legs 26. A manually operated clutch 98 may be connected to the shaft 96 such that the two gear boxes 54 may be disconnected and the legs operated individually. Alternatively, a single gear box 54 may be secured to the outside plates 38 of one of the legs 26 and the shaft 96 used to connect the box 54 to the opposite leg, such that the legs 26 are simultaneously raised and lowered through a single gear box. The arrangement of the gear box 54, shown in FIGS. 7–10, of course can be used with the inside mounting plate arrangements shown in FIGS. 3 and 4.

Thus, a single landing gear leg construction is disclosed that may be used as either the right or left leg of the landing gear and which can be used on trailers having either inside mounting plates or outside mounting plates. Furthermore, one or more gear boxes can be mounted in a number of positions on the side or sides of the legs opposite from the mounting plates and connected such that the legs may be individually operated or simultaneously raised and lowered.

Although we have described but several preferred embodiments of our invention, it is to be understood that various changes and revisions can be made therein without departing from the spirit of the invention or the scope of the appended claims.

We claim:

1. In combination with a trailer body having a pair of landing gear mounting plates secured to opposite sides thereof, a landing gear for supporting one end of said trailer body, said landing gear comprising:
   a pair of substantially identical landing gear legs, said legs being interchangeable between the left and right side of said trailer and each of said legs being substantially symmetrical about a plane through the vertical axis thereof and including a pair of elongated flange plates secured to its upper end on opposite sides thereof for securing said leg to one of said mounting plates and each of said flange plates being substantially symmetrical about a second plane through said axis and perpendicular to said first plane;
   a gear box selectively detachably mounted to either one of the legs on the flange plate opposite from said mounting plate; and
   means connecting said gear box to both of said legs for manually moving said legs between their extended and retracted positions.

2. The combination as defined in claim 1, wherein each of said flange plates includes vertically spaced apertures formed along opposite sides thereof for securing said leg to one of said mounting plates.

3. The combination as defined in claim 2, wherein said gear box is mounted on one of said flange plates by means of said vertically spaced apertures.

4. The combination as defined in claim 1, wherein said connecting means includes a rotatably mounted shaft.

5. The combination as defined in claim 1, and including a second gear box detachably mounted on the other of said legs on the flange plate opposite from said mounting plate, said connecting means including a clutching means for disengaging said connecting means such that said legs may be individually moved between their extended and retracted positions.

6. The combination as defined in claim 1, wherein said trailer body includes outside mounting plates and said legs are secured to the inner side of said mounting plates.

7. The combination as defined in claim 6, wherein each of said outside mounting plates includes a vertically disposed flange member secured to the inner edge of said plate, each of said flange members having two rows of vertically spaced apertures formed therein, and each of said flange plates including vertically spaced apertures formed along opposite sides thereof for aligning with said apertures formed in said flange members to secure said leg thereto.

8. The combination as defined in claim 1, wherein said trailer body includes inside mounting plates and said legs are secured to the outer side of said mounting plates.

9. The combination as defined in claim 8, wherein each of said inside mounting plates includes a vertically disposed flange member secured to the outer edge of said plate, each of said flange members having two rows of vertically spaced apertures formed therein, and each of said flange plates including vertically spaced apertures formed along opposite sides thereof for aligning with said apertures formed in said flange members to secure said leg thereto.

10. In combination with a trailer body having a pair of landing gear mounting plates secured to opposite sides thereof, a landing gear for supporting an end of said body, said landing gear comprising:

a pair of landing gear legs, said legs being interchangeable between the right and left side of said trailer and each of said legs being substantially symmetrical about a plane through the vertical axis thereof and including a pair of elongated flange plates secured to its upper end on opposite sides thereof for securing said leg to one of said mounting plates, and each of said flange plates being substantially symmetrical about a second plane through said axis perpendicular to said first plane;

a gear box detachably mounted on each of said legs on the flange plate opposite from said mounting plate for manually moving said legs between their extended and retracted positions.

11. The combination as defined in claim 10 wherein each of said flange plates includes vertically spaced apertures formed along opposite sides thereof for securing said leg to one of said mounting plates and securing said gear box to the opposite side of said leg.

12. The combination as defined in claim 10 wherein said trailer body includes outside mounting plates and said legs are secured to the inner side of said mounting plates.

13. The combination as defined in claim 10, wherein said trailer body includes inside mounting plates and said legs are secured to the outer side of said mounting plates.

* * * * *